(12) United States Patent
Meyers et al.

(10) Patent No.: US 6,635,694 B1
(45) Date of Patent: Oct. 21, 2003

(54) PREPARATION AGENTS

(75) Inventors: Franz Meyers, Charlotte, NC (US); Jügen Kastner, Bochum (DE); Michael Wedler, Duisburg (DE); Peter Weiser, Duisburg (DE); Jochen Winkler, Moers (DE); Wolf-Dieter Griebler, Moers (DE)

(73) Assignee: Sachtleben Chemie GmbH, Duisburg (DE)

( * ) Notice: Subject to any disclaimer, the term of this patent is extended or adjusted under 35 U.S.C. 154(b) by 0 days.

(21) Appl. No.: 09/763,388

(22) PCT Filed: Sep. 1, 1999

(86) PCT No.: PCT/EP99/06396

§ 371 (c)(1),
(2), (4) Date: Apr. 18, 2001

(87) PCT Pub. No.: WO00/14165

PCT Pub. Date: Mar. 16, 2000

(30) Foreign Application Priority Data

Sep. 2, 1998 (DE) .......................... 198 39 856

(51) Int. Cl.$^7$ .................................. C08K 3/00
(52) U.S. Cl. ..................................... 523/340
(58) Field of Search ........................... 523/340

(56) References Cited

U.S. PATENT DOCUMENTS

| 4,183,843 | A | * | 1/1980 | Koenig | ................. | 260/40 |
| 4,310,360 | A | * | 1/1982 | Kvant | ................. | 106/306 |
| 5,385,960 | A | * | 1/1995 | Emmons | ................. | 523/205 |
| 6,080,802 | A | * | 6/2000 | Emmons | ................. | 523/205 |
| 6,159,390 | A | * | 12/2000 | Fichou | ................. | 252/182.24 |
| 6,342,099 | B1 | * | 1/2002 | Hiew | ................. | 106/443 |

FOREIGN PATENT DOCUMENTS

| DE | 31 32 303 | 2/1983 |
| DE | 38 39 865 | 5/1990 |
| EP | 0 549 163 | 6/1993 |
| GB | 990 122 | 4/1965 |
| WO | 96 27638 | 9/1996 |

OTHER PUBLICATIONS

Patent Abstracts of Japan. Vol. 010, No. 023 Jan. 29, 1986 and JP 60 175530—Sep. 9, 1985.

\* cited by examiner

Primary Examiner—Edward J. Cain
(74) Attorney, Agent, or Firm—Fulbright & Jaworski L.L.P.

(57) ABSTRACT

A processing aid for further processing in synthetic polymers comprising finely divided, inorganic pigments and/or fillers. Such processing aids can homogeneously be dispersed with little effort when the same are embedded in an organic substance.

13 Claims, 1 Drawing Sheet

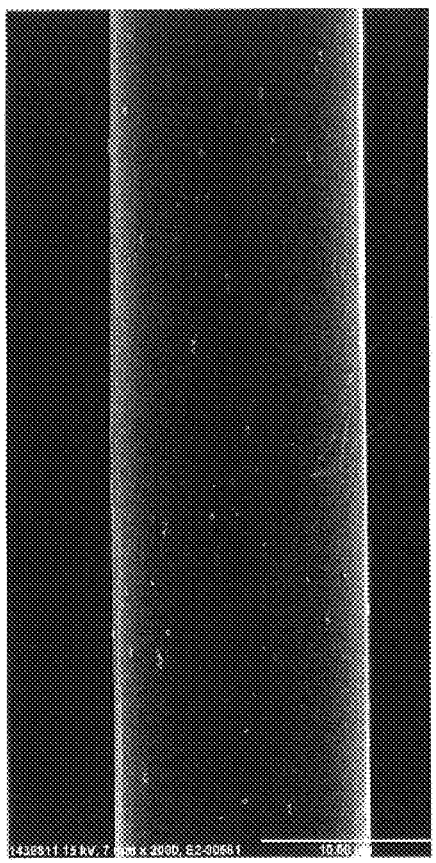
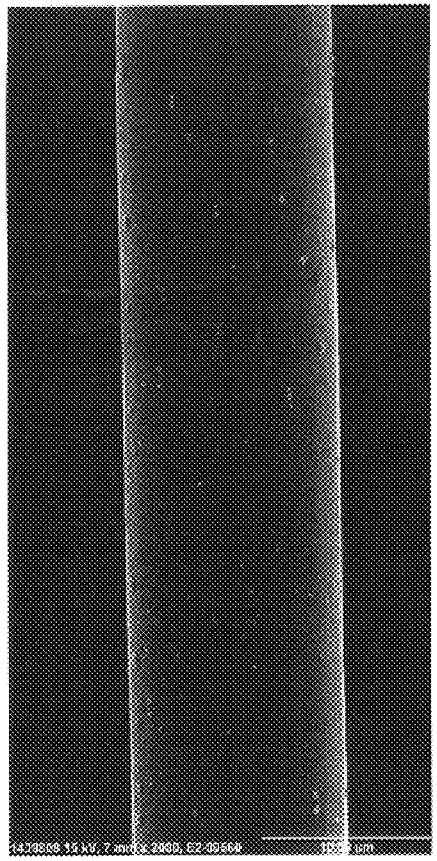
Fig. 1
Fig. 2

PREPARATION AGENTS

DESCRIPTION

This invention relates to processing aids for further processing in synthetic polymers, comprising finely divided inorganic solids, selected from pigments and/or fillers.

Processing aids are substances or mixtures which can be incorporated in synthetic polymers as functional additives; as fillers and/or pigments they should ensure improved or additional technical properties as compared to the unfilled product and/or have pigment-specific properties, i.e. there is no clear-cut dividing line between filler and pigment.

To ensure that fillers and pigments, which are present in the form of a powder, can be incorporated in synthetic polymers as functional additives and can fully show their effect, the same require a pretreatment which involves a considerable effort.

This pretreatment usually includes the following process steps:

introducing the pigment and/or filler in a liquid medium predispersing by using weak shearing forces, e.g. by means of dissolver or rotor-stator systems fine dispersing by using strong shearing forces, e.g. by means of stirrer mills further processing steps, such as centrifuging, depositing and/or filtering.

In particular the energy-rich and thus cost-intensive process step of fine dispersing is used for grinding and homogeneously distributing the starting products which are generally present in the form of agglomerates. The pigment or filler suspension prepared by the user with such an effort can be supplied to the actual polymer production process.

A further possibility is to directly add the solids as powder or in the form of master batches to the process of producing the synthetic polymers.

In both cases, the solids must be distributed in the molten highly viscous polymer; there are considerable dosage problems, as the solids to be designated as blunt substantially aggravate a uniform introduction thereof. Moreover, in the extrusion step there is provided a polymer melt with a viscosity of up to 500 Pa.s, in which there are no high enough shearing forces in order to comminute solid agglomerates.

It is the object of the present invention to provide processing aids as described above for further processing in synthetic polymers, which can homogeneously be dispersed in the same easily and with little effort.

This object is solved in that the finely dispersed solids are embedded in a carrier material, selected from at least one of the organic substances polyols, polyglycols, polyethers, dicarboxylic acids and the derivatives thereof, adipic hexamethylenediamine, caprolactam, paraffins, phosphoric acid ester, hydroxycarboxylic acid ester and cellulose.

As material for the solids there may in particular be used titanium dioxide, barium sulfate, calcium carbonate, lithopones, silica, alumosilicates, zinc sulfide, alumina, kaolins, talcum, dolomites and calcites.

In accordance with the preferred aspect of the invention, the content of solids in the processing aids is 0.2 to 35 wt-%, in particular 10 to 30 wt-%.

Since the particle size of the inorganic solids is 0.01 to 10 $\mu$m, preferably 0.1 to 0.8 $\mu$m, good properties can be achieved therewith as regards delustring, in particular of synthetic fibers.

To avoid oxidation phenomena in the organic substance, the same still contains up to 5 wt-%, preferably up to 2 wt-%, of at least one of the commercially available antioxidants such as Irganox 1010, Cibatex 4458, Irganox 1098, and Irganox B 1171 (manufacturer: Ciba Spezialitäten Chemie GmbH, Lam-pertheim).

In accordance with the further embodiment of the invention, the organic substance consists of polyethylene glycol with molar weights of 1000 to 3000. This substance has a good wettability and a good embedding capacity for the inorganic solids.

The processing aid present with a particle size of 3 to 100 $\mu$m is free-flowing, easy to meter and easy to disperse. In addition, the solids contained in the processing aid are free from oversize particles and exhibit no tendency towards reflocculation. The processing aid can be dispersed in synthetic polymers with relatively low shearing forces.

The production of the processing aids is effected such that an aqueous master batch containing 20 to 60 wt-% solids is dispersed with 0.2 to 50 wt-% (based on the solids content) organic substances, the dispersion is ground wet to a mean particle size $d_{50}$ of 0.1 to 0.8 $\mu$m, the content of particle sizes >1 $\mu$m is separated, and then the dispersion is dried.

In accordance with the further aspect of the process measures wet grinding is effected in a stirrer ball mill, the separation of oversize particles >1 $\mu$m is effected by depositing, filtering or centrifuging, and drying the suspension is effected by spray drying or mill drying.

The invention will subsequently be explained in detail with reference to several embodiments:

1st Embodiment

In an open stirred tank, 8004 g demineralized water and 696 g polyethylene glycol type 3000 (corresponding to 12% based on the solids content) are provided, and 5800 g (corresponding to 40% based on the dispersing charge) unground $TiO_2$ are added in portions by stirring. After predispersing this mixture by means of a dissolver, a double bead grinding is effected with a continuously operating 1.4 l bead mill with a throughput of about 8 l/h. Subsequently, the suspension produced in this way is dried with an electric spray tower.

2nd Embodiment

In an open stirred tank, 8515 g demineralized water and 585 g polyethylene glycol type 2000 (corresponding to 15% based on the solids content) are provided, and 3900 g (corresponding to 30% based on the dispersing charge) finely divided barium sulfate are added in portions by stirring. After predispersing this mixture by means of a dissolver, bead grinding is effected with a continuously operating 1.4 l bead mill with a through put of about 8 l/h. Subsequently, the suspension produced is spray-dried with an electric spray tower.

3rd Embodiment

A mixture of 37.5 wt-% ethane diol (staple fiber quality) and 62.5 % of the processing aid prepared in accordance with the 1st embodiment is weakly dispersed in a stirred tank by means of a dissolver adapted to the tank size and subsequently added to the polyester production process between the preesterification stage or transesterification stage and the prepolycondensation stage. With the low dispersion energy used, the polyester filaments prepared from the polyester exhibit the same particle distribution in the polymer as when using a commercially available $TiO_2$ sample subjected to a complex dispersion process in accordance with the prior art. A corresponding comparison of two scanning electron micrographs of PET filaments is represented in FIG. 1 and FIG. 2 of the drawing.

What is claimed is:

1. A method for preparing a processing aid comprising the steps of:

preparing an aqueous dispersion by dispersing 20 to 60% by weight of the aqueous dispersion of at least one inorganic solid selected from the group consisting of pigments and fillers into an aqueous premix comprising water and 0.2 to 50% by weight of carrier material relative to the inorganic solids content of the finished processing aid to form said aqueous dispersion; said carrier material comprising an organic substance selected from the group consisting of a polyol, a polyglycol, a polyether, a dicarboxylic acid, a derivative of a dicarboxylic acid, adipic hexamethylenediamine salts, caprolactam, paraffin, a phosphoric acid ester, a hydroxycarboxylic acid ester and cellulose;

wet grinding said aqueous dispersion to form particles having an average particle size $d_{50}$ of from 0.1 to 0.8 microns to form an aqueous suspension;

separating and removing particles greater than 1 micron from said aqueous suspension and drying said aqueous suspension to form the processing aid, said processing aid comprising said inorganic solid embedded in said carrier material.

2. The method of claim 1, wherein said inorganic solids are selected from the group consisting of titanium dioxide, barium sulfate, calcium carbonate, lithopones, silica, alumosilicates, zinc sulfide, alumina, a kaolin, talcum, a dolomites and a calcite.

3. The method of claim 1, wherein the content of said organic substance is from 10 to 30 wt-%.

4. The method of claim 1, wherein the solids have an average particle size $d_{50}$ of from 0.2 to 0.5 microns.

5. The method of claim 1, wherein said organic substance comprises up to 5 wt-% of an antioxidant.

6. The method of claim 1, wherein said organic substance is a polyethylene glycol.

7. The method of claim 6, wherein said polyethylene glycol has a molar weight of from 1000 to 3000.

8. The method of claim 1, wherein the wet grinding of the dispersion is performed in a bead mill.

9. The method of claim 1, wherein the suspension is spray dried.

10. The method of claim 1, wherein the suspension is dried by grinding.

11. The method of claim 1, wherein particles greater than 1 micron are separated by sedimentation, filtration or centrifugation.

12. The method of claim 1, wherein said processing aid has a particle size of from 3 to 100 microns.

13. The processing aid prepared by the process of claim 1.

* * * * *